United States Patent
Barber et al.

(10) Patent No.: US 7,386,430 B2
(45) Date of Patent: Jun. 10, 2008

(54) METHOD OF CORRECTING TRIAXIAL INDUCTION ARRAYS FOR BOREHOLE EFFECT

(75) Inventors: Thomas D. Barber, Houston, TX (US); Tracy E. Broussard, Houston, TX (US); Gerald N. Minerbo, Missouri City, TX (US); Hanming Wang, Sugar Land, TX (US); Sofia Davydycheva, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 502 days.

(21) Appl. No.: 10/708,719

(22) Filed: Mar. 19, 2004

(65) Prior Publication Data

US 2005/0256642 A1 Nov. 17, 2005

(51) Int. Cl.
G06G 7/48 (2006.01)
G01V 3/18 (2006.01)
E21B 49/00 (2006.01)

(52) U.S. Cl. ............... 703/10; 703/6; 324/339; 702/6; 702/7; 73/152.06

(58) Field of Classification Search .............. 703/6, 703/10; 702/6, 7; 73/152.06; 324/339
See application file for complete search history.

(56) References Cited

U.S. PATENT DOCUMENTS

| | | | |
|---|---|---|---|
| 5,115,871 A * | 5/1992 | McCann et al. ............... 175/50 |
| 5,663,499 A * | 9/1997 | Semmelbeck et al. ... 73/152.06 |
| 6,297,639 B1 | 10/2001 | Clark et al. |
| 6,304,086 B1 | 10/2001 | Minerbo et al. |
| 6,351,127 B1 | 2/2002 | Rosthal et al. |
| 6,380,744 B1 | 4/2002 | Clark et al. |
| 6,502,036 B2 | 12/2002 | Zhang et al. |
| 6,541,979 B2 | 4/2003 | Omeragic |
| 6,556,015 B1 | 4/2003 | Omeragic et al. |
| 6,557,794 B2 | 5/2003 | Rosthal et al. |
| 6,566,881 B2 | 5/2003 | Omeragic et al. |
| 6,573,222 B1 | 6/2003 | Nair et al. |
| 6,584,408 B2 | 6/2003 | Omeragic |
| 6,594,584 B1 | 7/2003 | Omeragic et al. |
| 6,624,634 B2 | 9/2003 | Rosthal et al. |
| 6,630,830 B2 | 10/2003 | Omeragic et al. |
| 6,667,620 B2 | 12/2003 | Homan et al. |
| 6,693,430 B2 | 2/2004 | Rosthal et al. |
| 6,820,702 B2 * | 11/2004 | Niedermayr et al. .......... 175/57 |

(Continued)

Primary Examiner—Paul Rodriguez
Assistant Examiner—Ayal Sharon
(74) Attorney, Agent, or Firm—Kevin T. McEnaney; Bryan L. White (57) ABSTRACT

A method for modeling borehole effects of a transverse array induction tool includes selecting a formation-borehole model having a set of parameters, wherein the set of parameters comprises a direction of tool eccentering; determining initial values for the set of parameters; computing expected responses for a selected set of arrays from the plurality of arrays of the induction tool, wherein the computing is based on the formation-borehole model; comparing the expected responses with actual responses for the selected set of arrays; adjusting values of the set of parameters, if a difference between the expected responses and the actual responses is no less than a predetermined criterion; repeating the computing, the comparing, and the adjusting, until the difference between the expected responses and the actual responses is less than the predetermined criterion; determining the borehole effects from final values of the set of parameters.

21 Claims, 10 Drawing Sheets

U.S. PATENT DOCUMENTS

| | | |
|---|---|---|
| 7,076,370 B1 * | 7/2006 | Freedman et al. .............. 702/6 |
| 7,091,722 B2 * | 8/2006 | Homan et al. .............. 324/339 |
| 2002/0057210 A1 | 5/2002 | Frey et al. |
| 2002/0079899 A1 | 6/2002 | Frey et al. |
| 2003/0085707 A1 | 5/2003 | Minerbo et al. |
| 2003/0184304 A1 | 10/2003 | Homan et al. |
| 2003/0184488 A1 | 10/2003 | Smith et al. |
| 2003/0200029 A1 | 10/2003 | Omeragic et al. |
| 2003/0229450 A1 | 12/2003 | Strickland |
| 2005/0083161 A1 | 4/2005 | Minerbo et al. |

* cited by examiner

METHOD OF CORRECTING TRIAXIAL INDUCTION ARRAYS FOR BOREHOLE EFFECT

BACKGROUND OF INVENTION

1. Field of the Invention

The invention relates generally to techniques for formation resistivity logging using induction tools. More particularly, the invention relates to methods and systems for correcting borehole effects in resistivity measurements obtained with induction tools that include transverse or triaxial arrays.

2. Background Art

Induction tools are used in the oil and gas industry to determine the resistivity of earth formations surrounding a borehole. Induction tools work by using a transmitting coil (transmitter) to set up an alternating magnetic field in the earth formations. This alternating magnetic field induces eddy currents in the formations. One or more receiving coils (receivers), disposed at a distance from the transmitter, are used to detect the current flowing in the earth formation. The magnitudes of the received signals are proportional to the formation conductivity. Therefore, formation conductivities may be derived from the received signals.

However, heterogeneities in the formation complicate the derivation of formation conductivity from the received signals. The most prevalent complication that affects the derivation of formation conductivity from the received signals arises from the presence of conductive fluids in the borehole surrounding the induction instrument. This is referred to generally as the borehole effects. Often, the fluids in the borehole (drilling mud) are made very saline, thus conductive, as part of the drilling practice. The conductive drilling muds can contribute a significant proportion of the received signals and, therefore, should be carefully removed.

Recently, transverse induction instruments have been developed for investigating the resistivities of formations with anisotropy, dipping planes, faults, or fractures. These transverse induction instruments have transmitting and receiving coils arranged such that the magnetic moments of the transmitter and/or receiver coils are perpendicular to the axis of the borehole. It is well known that the borehole effects of transverse coil arrangements are very large when the instrument is moved eccentrically in the borehole in the direction perpendicular to the coil magnetic moments. See e.g., Moran and Gianzero, "*Effects of Formation Anisotropy on Resistivity Logging Measurements*," Geophysics, 44, 1266-1286 (1979).

The cause of the eccentricity effect of transverse coils is disclosed in U.S. Pat. No. 6,573,722, issued to Rosthal et al. This patent teaches a method for mitigating the eccentric borehole effects of an induction tool. Specifically, this patent discloses tool designs in which an induction tool includes a conductive member in its insulating sleeve or the induction tool includes a conductive tool body. These conductive parts greatly reduce the borehole effects of such an instrument, but does not remove all of the effects. Further correction would be necessary to completely remove the borehole effects of a transverse induction instrument.

U.S. Pat. No. 5,041,975, issued to Minerbo et al. discloses a method for correcting borehole effects of array induction instruments. This method uses the data from the 4 shortest arrays of an array induction tool, along with approximate measurements of the hole size and the borehole fluid conductivity, to solve for 2 parameters in a 4-parameter borehole-formation model. The model consists of a borehole having a radius r drilled in a homogeneous formation of conductivity $\square_f$. The borehole fluid has a conductivity $\square_m$, and the induction tool is located at a distance (standoff) s from the borehole wall. A fast forward model consists of a large table built from a number of cases over appropriate ranges of the 4 parameters. An inversion process minimizes the penalty function E, which is the sum of the squares of a weighted difference between the measured response and predicted response, as shown in Equation (1):

$$E(\overline{\sigma}_f) = \sum_{j=1}^{4} \frac{|\sigma_{meas}^j - \sigma_{model}^j(\sigma_m, \overline{\sigma}_f, r, s)|^2}{\varepsilon^j}. \quad (1)$$

In this equation Equation $$\sigma_{meas}^j$$

is the modeled conductivity from the j-th array with the given parameters $\square_m$, $\square_f$, r, and s. When E is minimized, the associated parameters $\square_m$, $\square_f$, r, and s are used to compute the borehole correction for all the arrays.

While effective methods are available for correcting borehole effects for axial arrays, transverse array instruments present special problems. The sensitivity of induction arrays with moments perpendicular to the axis of the borehole to eccentricity is very different depending on whether the eccentricity is in the direction of the magnetic moment or perpendicular to the magnetic moment. U.S. Pat. No. 6,556,015 issued to Omeragic et al. describes methods of reducing the effect of the borehole on induction measurements with transverse coils through mechanical or electromagnetic rotation of the tool about its axis. However, there still exists a need for better methods for borehole effect corrections that can be used with transverse array instruments.

SUMMARY OF INVENTION

One aspect of the invention relates to methods for modeling borehole effects of an induction tool having a plurality of arrays that include at least one transverse array. A method in accordance with one embodiment of the invention includes selecting a formation-borehole model having a set of parameters, wherein the set of parameters comprises a direction of tool eccentering; determining initial values for the set of parameters; computing expected responses for a selected set of arrays from the plurality of arrays of the induction tool, wherein the computing is based on the formation-borehole model; comparing the expected responses with actual responses for the selected set of arrays; adjusting values of the set of parameters, if a difference between the expected responses and the actual responses is no less than a predetermined criterion; repeating the computing, the comparing, and the adjusting, until the difference between the expected responses and the actual responses is less than the predetermined criterion; determining the borehole effects from final values of the set of parameters.

Another aspect of the invention relates to systems for borehole effects of an induction tool having a plurality of arrays that include at least one transverse array. A system in accordance with one embodiment of the invention includes a processor and a memory, wherein the memory stores a program having instructions for: selecting a formation-borehole model having a set of parameters, wherein the set of parameters comprises a direction of tool eccentering; determining initial values for the set of parameters; computing expected responses for a selected set of arrays from the plurality of arrays of the induction tool, wherein the computing is based on the formation-borehole model; comparing the expected responses with actual responses for the selected set of arrays; adjusting values of the set of parameters, if a difference between the expected responses and the actual responses is no less than a predetermined criterion; repeating the computing, the comparing, and the adjusting, until the difference between the expected responses and the actual responses is less than the predetermined criterion; determining the borehole effects from final values of the set of parameters.

Other aspects and advantages of the invention will be apparent from the following description and the appended claims.

DETAILED DESCRIPTION

Embodiments of the invention relate to methods and systems for correcting borehole effects in induction tools having transverse or triaxial antennas. Methods of the invention are applicable to both induction tools and propagation tools. Because the distinction between an induction tool and a propagation tool is not germane to this invention, the term "induction tool" is used in this description to include both the induction and propagation tools. Similarly, borehole effects and tool eccentering effects (or eccentricity effects) are used interchangeably in this description because the distinction between them is not germane. One of ordinary skill would appreciate that conductivity is an inverse of the resistivity, and, therefore, any reference to "conductivity" in this description is intended to include its inverse, the "resistivity," and vice versa.

As noted above, induction arrays with magnetic moments perpendicular (i.e., transverse) to the axis of the borehole are more sensitive to the borehole effects. In addition, the sensitivity of a transverse coil to eccentricity is very different depending on whether the eccentricity is in the direction of the magnetic moment or perpendicular to the magnetic moment. In this description, a transverse array is used in a broad sense to include any array having a transverse component in its magnetic moment. For example, an array having a tilted coil (i.e., a coil not parallel or perpendicular to the axis of the tool) will have a transverse component in its magnetic moment and, therefore, may be referred to as a transverse array in this description. Similarly, a triaxial array is a subset of a transverse array.

Figure 1A:
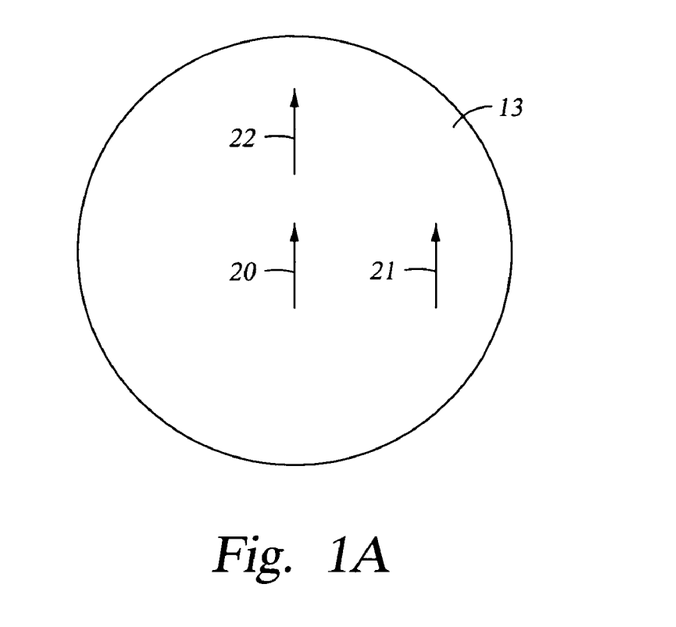
FIGS. 1a and 1b, respectively, illustrate tool eccentering of a transverse array and the asymmetric current distribution that causes the undesired borehole effects.
Figure 1B:
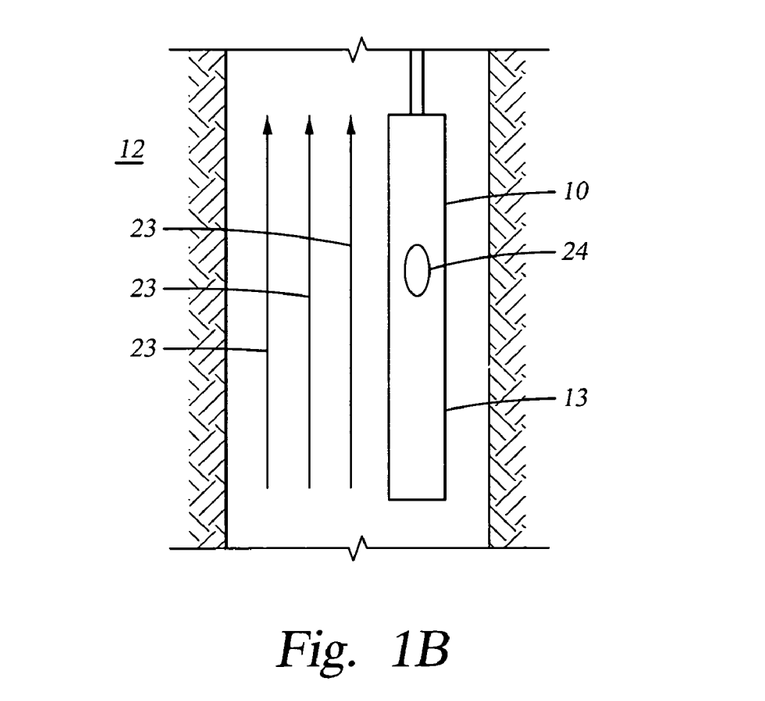

FIG. 1a illustrates that a logging tool may have its transverse or tilted magnetic dipole (TMD) antenna located at the center (shown as 20) of the borehole 13 or eccentered in a parallel direction (shown as 22) or a perpendicular direction (shown as 21). The parallel or perpendicular direction is with respect to the direction of the magnetic dipole of the antenna. Parallel eccentering 22 produces eddy currents up and down the borehole. However, due to the symmetry, no net current flows up or down the borehole. Thus, a tool having its TMD antenna eccentered in the parallel direction 22 does not produce undesired effects more than a tool having its TMD antenna perfectly at the center of the borehole 20 does. In contrast, a tool having its TMD antenna eccentered in the perpendicular direction 21 induces eddy currents to flow up and down the borehole, but without the symmetry to cancel out the up and down currents. As a result, perpendicular eccentering 21 gives rise to significant borehole currents 23, as shown in FIG. 1b. The current flow in the formation is also asymmetric in this case. The asymmetric current distribution produces a strong signal in a receiver 24 disposed on the resistivity instrument 10.

The perpendicular eccentering 21 and parallel eccentering 22 shown in FIG. 1a illustrate the extremes of tool displacements from the center of the borehole 20. In a typical case, the eccentering would likely lie between these two extremes, i.e., eccentering in a direction that is a combination of both the x and y directions.

Figure 2:
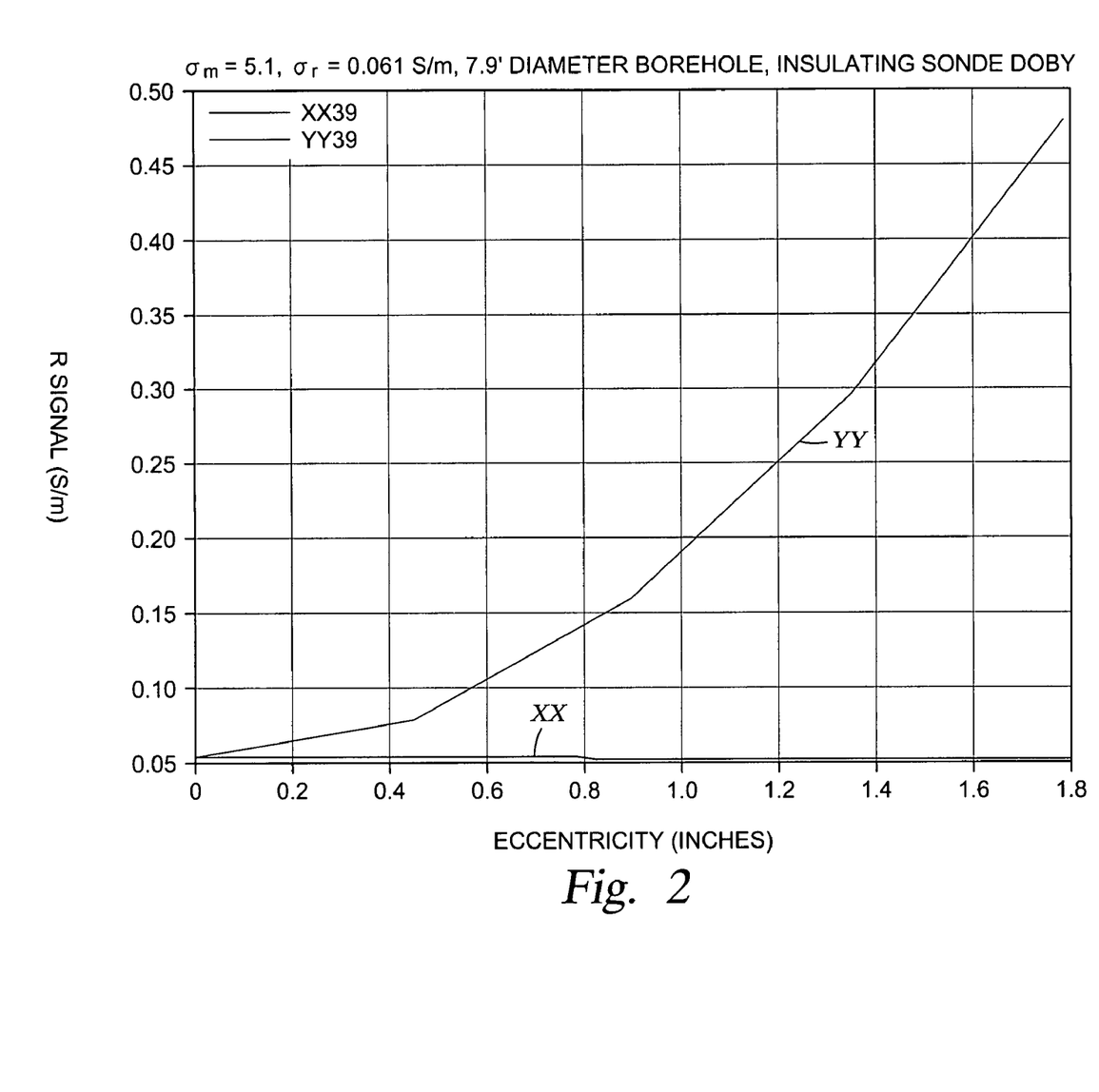
FIG. 2 shows a comparison of the eccentricity effects in two different directions of a transverse induction array in an insulating sleeve.

FIG. 2 shows that the eccentricity effects of an induction tool. The curves shown are for a tool having an insulating sleeve disposed in a 7.9" diameter borehole. The conductivity of the mud ($\sigma_m$) is 5.1 S/m and the conductivity of the formation ($\sigma_f$) is 0.061 S/m. As shown, curve xx represents eccentering of the tool in the x-direction (the direction of the magnetic moment). This situation is shown as 22 in FIG. 1a. As noted above, eccentering in the direction parallel with the direction of the magnetic moment produces minimal borehole effects, Thus, curve xx is essentially flat as a function of the eccentricity. In contrast, curve yy, which depicts eccentering in the direction perpendicular to the direction of the magnetic moment (shown as 21 in FIG. 1a), is very sensitive to the eccentering distances. As shown in FIG. 2, the eccentering effects in the direction perpendicular to the direction of the magnetic moment of the coil (curve yy) can be up to two orders of magnitude stronger than that in the direction parallel with the magnetic moment (curve xx).

Figure 3:
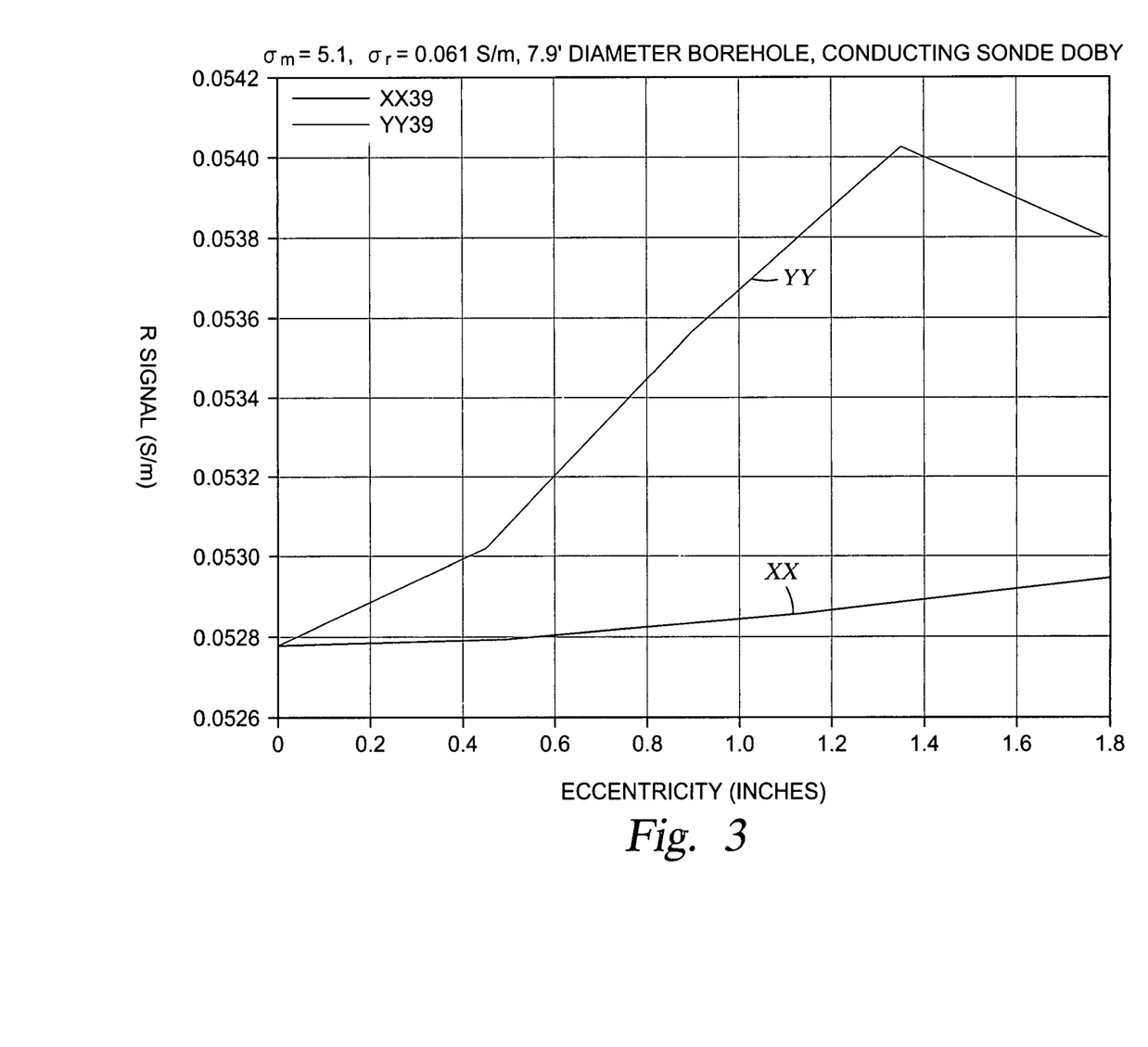
FIG. 3 shows residual eccentricity effects in two different directions of a transverse induction array on a conducting mandrel.

The unusual sensitivity to the eccentricity in the direction perpendicular to the magnetic moment can be reduced by inclusion of a conductive member in the insulating sleeve, as disclosed in U.S. Pat. No. 6,573,722 issued to Rosthal, et al. However, inclusion of a conductive member in the insulating sleeve does not completely eliminate the differential effects. As shown in FIG. 3, the eccentric effects in the direction perpendicular to the direction of the magnetic moment (curve yy) are still more significant than the eccentricity effects in the direction parallel with the direction of the magnetic moment (curve xx), although they are on the same order of magnitude. The curves shown in FIG. 3 are for a tool having a conductive mandrel disposed in a 7.9" diameter borehole. The conductivity of the mud ($\sigma_m$) is 5.1 S/m and the conductivity of the formation ($\sigma_f$) is 0.061 S/m.

Figure 4:
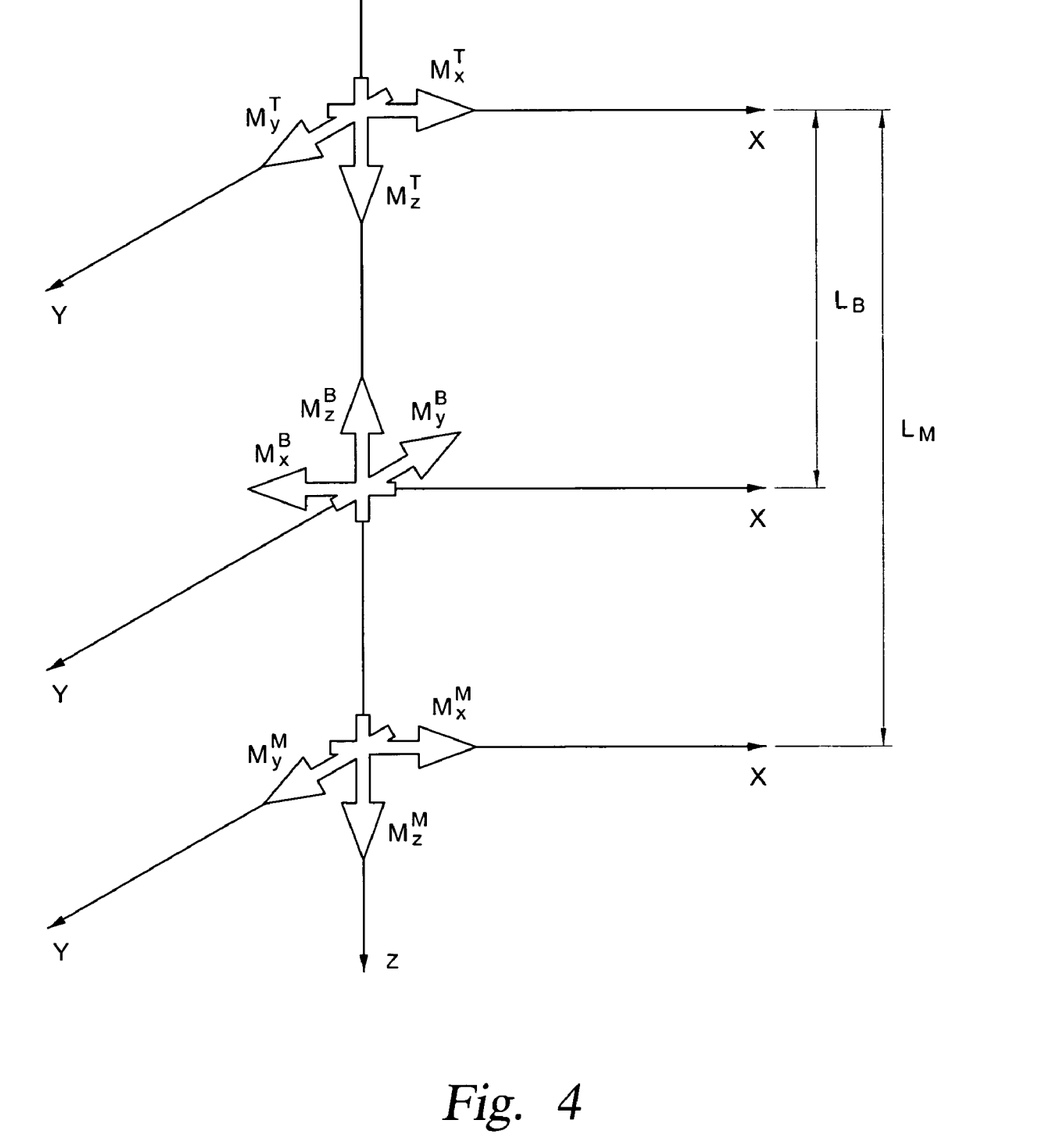
FIG. 4 illustrates a layout of a triaxial induction array showing the tool coordinate system.

The most common arrangement for an induction tool having transverse coils is a fully triaxial array, as shown in FIG. 4. FIG. 4 shows that the triaxial array consists of a triad of transmitters mounted orthogonally and a triad of receivers at a spacing $L_m$ mounted in substantially the same orthogonal directions as the transmitter coils. In FIG. 4, the triad transmitters are shown as having magnetic moments, $M_x^T$, $M_y^T$, $M_z^T$, while the triad receivers are shown as having magnetic moments, $M_x^M$, $M_y^M$, $M_z^M$. Such an arrangement is called a two-triad array. Such an array is not useful in an actual logging operation because the direct couplings between the i-th transmitter and the i-th receiver (i=1, 2, 3) are much larger than any signal from the formation. The adverse effects from the mutual couplings can be mitigated, in a way similar to a conventional axial induction array, by mounting a triad of orthogonal receivers between the main receiver triad and the transmitter triad. This additional triad is referred to as a balancing triad (or a bucking triad). In FIG. 4, the balancing triad is shown at a distance $L_B$ from the transmitter triad, as having magnetic moments $$M_x^B, M_y^B, M_z^B.$$

The number of turns in each coil of a balancing triad is adjusted so that, in air, the sum of the voltages detected by the main and balancing triads is zero. That is, $$V'_m + V'_b = 0, \quad (2)$$

where $$V'_m$$

is the voltage induced in the i-th main receiver by the i-th transmitter, and $$V'_\sigma$$

is the voltage induced on the i-th balancing receiver by the same i-th transmitter.

The array shown in FIG. 4 produces nine couplings. The voltages can be considered as a matrix V:

$$V = \begin{bmatrix} V_{xx} & V_{xy} & V_{xz} \\ V_{yx} & V_{yy} & V_{yz} \\ V_{zx} & V_{zy} & V_{zz} \end{bmatrix}, \quad (3)$$

where $v_{ij}$ is the voltage detected by the i-th receiver from energizing the i-th transmitter. Depending on the directions of eccentricity, each or some of these couplings may have associated eccentricity effects (borehole effects) that would need to be corrected.

Figure 5:
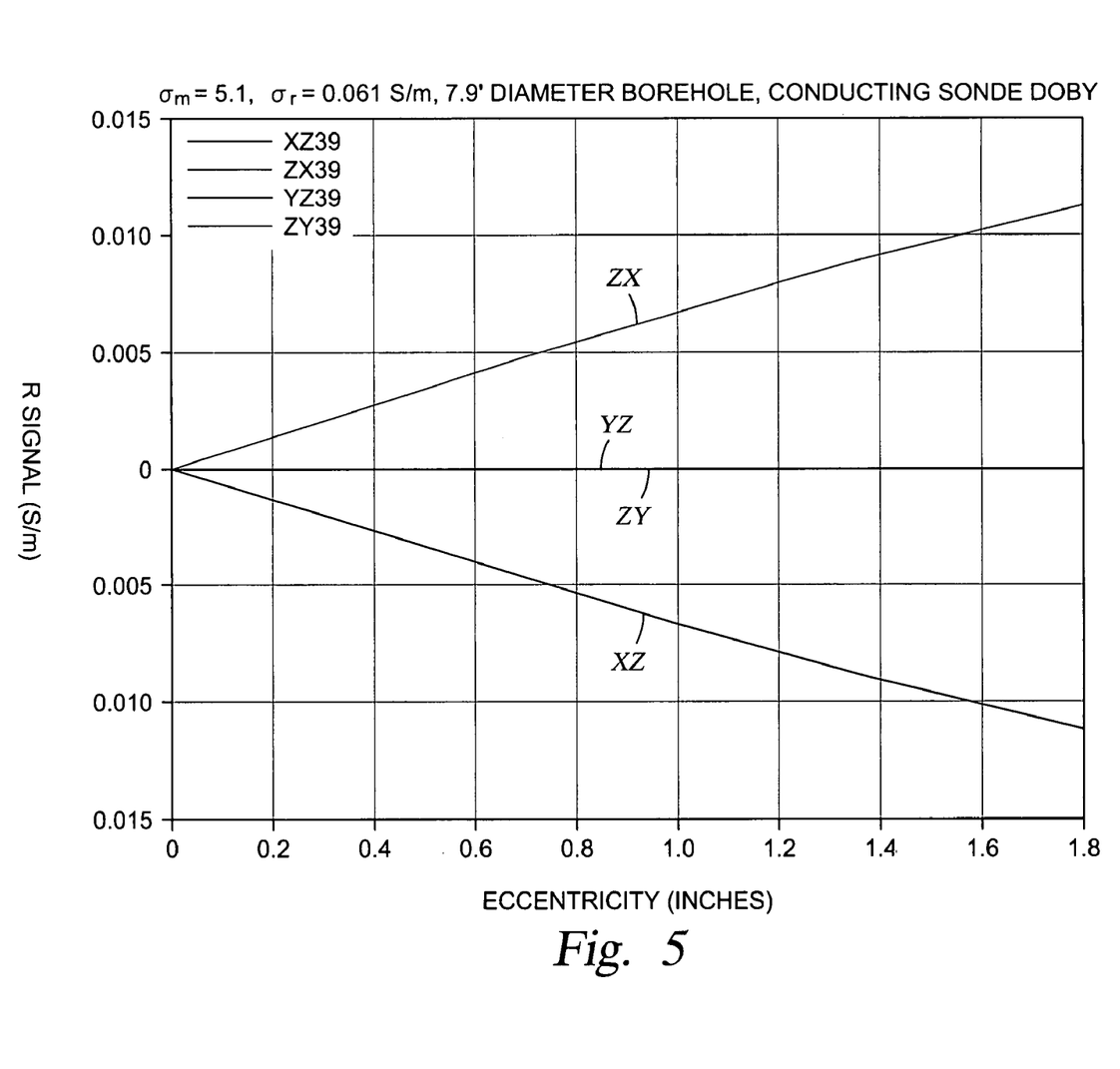
FIG. 5 shows residual eccentricity effects of cross-couplings of a triaxial induction tool.

As an example, FIG. 5 shows the eccentricity effects of the xz, zx, yz, and zy couplings. The curves shown are for a tool having a conductive sonde body, disposed in a 7.9" diameter borehole, and eccentered in the x direction. The conductivity of the mud ($\sigma_m$) is 5.1 S/m and the conductivity of the formation ($\sigma_f$) is 0.061 S/m. When the tool is displaced along the x direction in a circular cylindrical borehole, there are only five non-zero couplings, i.e., the matrix V has the form $$V = \begin{bmatrix} V_{xx} & 0 & V_{xz} \\ 0 & V_{yy} & 0 \\ V_{zx} & 0 & V_{zz} \end{bmatrix} \quad (4)$$

Among the four couplings shown in FIG. 5, only xz and zx couplings are influenced by the borehole effects, because yz and zy couplings produce substantially zero signals, as illustrated in Equation (4). On the other hand, if the eccentering is in the y direction, then the yz and zy couplings will have substantial borehole effects, while xz and zx couplings will have no borehole effects. In practice, the tool is likely eccentered in a direction that is a combination of the x and y directions. Therefore, these four couplings are likely all influenced by the borehole effects. The relative magnitudes of the borehole effects among these four couplings depend on the actual eccentering direction. Therefore, it should be possible to derive the eccentering direction of the tool from the borehole effects in these four couplings. A method for deriving the eccentering direction from these measurements will be described later. In addition, these couplings may be included in an inversion process to enable more sensitive determination of the eccentering direction.

Figure 6:
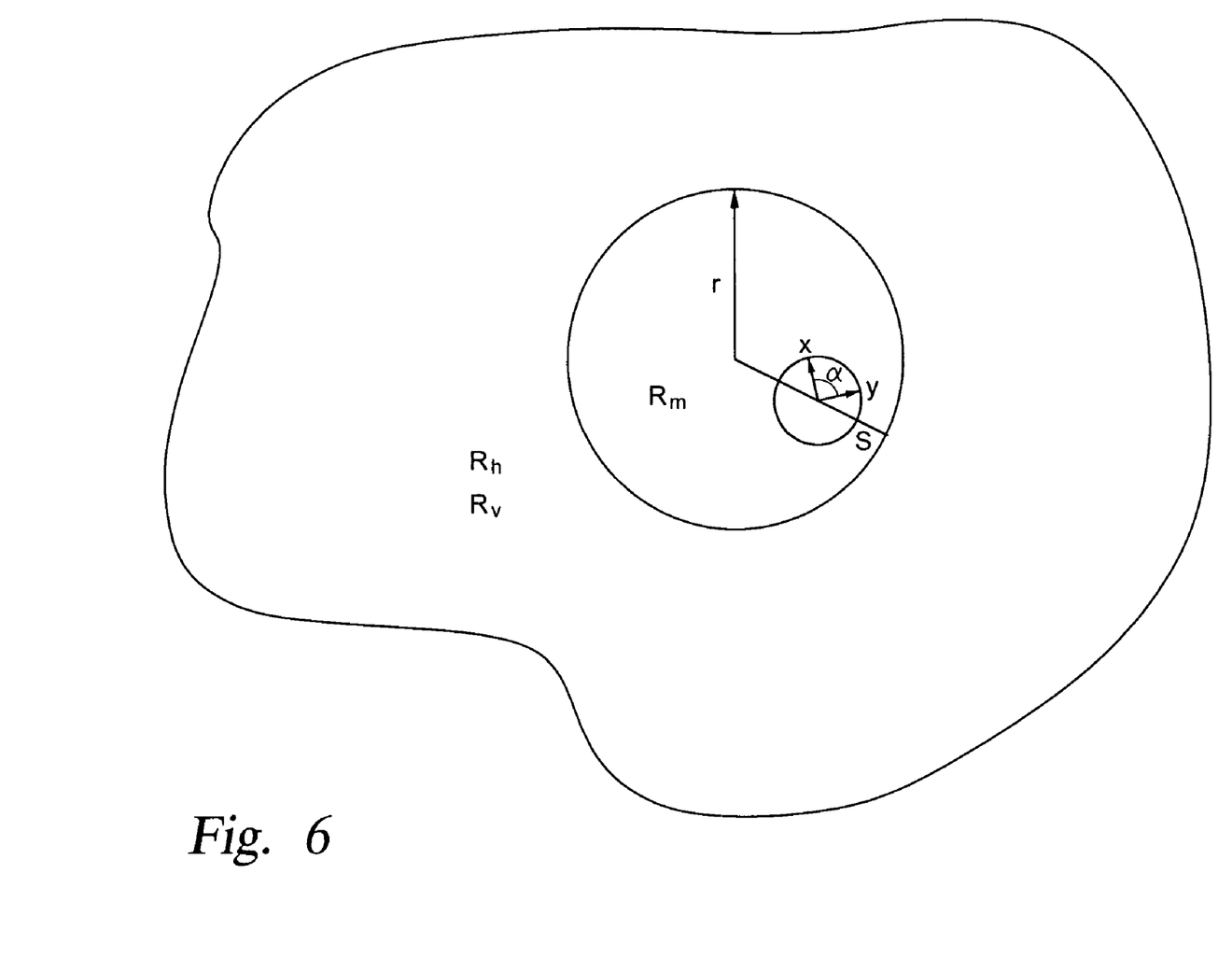
FIG. 6 shows a parametric model for borehole effect correction of a triaxial induction array in accordance with one embodiment of the invention.

The borehole/eccentricity effect of each coupling of a triaxial array can be described as a parametric model in a similar manner to the axial coils described above. However, the model for the triaxial arrays will have additional parameters. First, because the borehole effects depend on the direction of tool eccentering, the model should include the standoff and its direction relative to the tool x-axis (or y-axis). In addition, the transverse arrays are sensitive to formation anisotropy. Therefore, according to some embodiments of the invention, the formation conductivity in the model may include anisotropic components. In this case, the formation-borehole model for calibrating a triaxial array includes six parameters: $\square_m$, $\square_{fh}$, $\square_{fh}$, r, s, and the eccentering direction $\square$. A formation-bore-hole model including these six parameters are illustrated in FIG. 6. One of ordinary skill in the art would appreciate that a formation model for use in the calibration of a triaxial array may include more or less than six parameters. For example, a formation-borehole model for calibrating a triaxial array may further include dipping angles, if the formation includes dipping planes or the borehole is a deviated hole. Similarly, the formation-borehole model for calibrating a triaxial array may include five parameters: $\square_m$, $\square_f$, r, s, and the eccentering direction $\square$—if the formation is isotropic.

Figure 7:
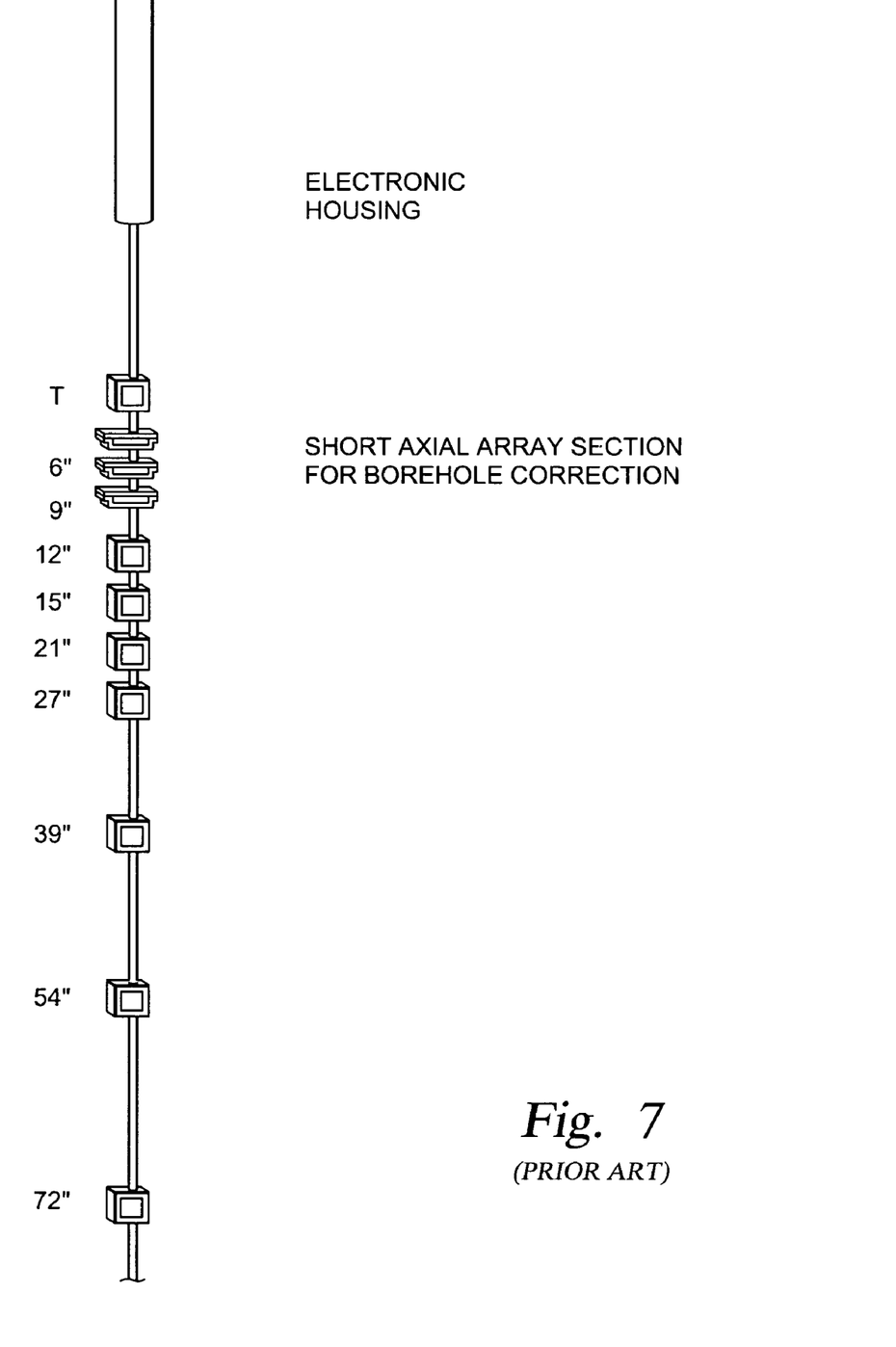
FIG. 7 shows a multi-array triaxial induction tool having a triaxial transmitter, 3 axial receiver arrays, and 6 triaxial receiver arrays.

A preferred triaxial induction tool my include a triaxial transmitter, several axial receiver arrays, and at least one triaxial receiver array. For example, FIG. 7 illustrates one embodiment of a triaxial induction tool having a triaxial transmitter, 3 axial receiver arrays, and 6 triaxial receiver arrays. The data from each of the 3 axial arrays include the following couplings:

$$\begin{bmatrix} V_{xz} \\ V_{yz} \\ V_{zz} \end{bmatrix} \quad (5)$$

Each of the triaxial arrays on a tool shown in FIG. 7 has 9 couplings as shown in Equation (6).

$$\begin{bmatrix} V_{xx} & V_{xy} & V_{xz} \\ V_{yx} & V_{yy} & V_{yz} \\ V_{zx} & V_{zy} & V_{zz} \end{bmatrix} \quad (6)$$

$$E_T(\overline{\sigma_{fh}}, \overline{\sigma_{fv}}) = \sum_{j=1}^{4} \sum_{i=1}^{N} \frac{|\sigma_{meas}^{ij} - \sigma_{model}^{ij}(\sigma_m, \overline{\sigma_{fh}}, \overline{\sigma_{fv}}, r, \alpha, s)|^2}{\varepsilon^{ij}}, \quad (7)$$

Each or some of these couplings may include borehole/eccentering effects, which would need to be removed before deriving formation resistivity from these measurements.

As noted above, a method for correcting borehole effects for an axial array is disclosed in U.S. Pat. No. 5,041,975 issued to Minerbo and Miles. This patent is assigned to the assignee of the present invention and is incorporated by reference in its entirety. According to the method disclosed in this patent, a formation model includes four parameters: mud conductivity ($\square_m$), borehole radius (r), standoff distance (s), and the formation conductivity ($\square_f$). Often, the mud conductivity ($\square_m$) and the standoff (s) are known. According to a method disclosed in this patent, measurements from the four shortest arrays are used in an inversion process to derive the parameters of the formation model.

If this method is extended to a triaxial tool shown in FIG. 7, data from the 4 shortest arrays may be used to solve for borehole parameters. Alternatively, data from other couplings may be selected for inclusion in the computation based on desired properties. For example, the xz and yz couplings are quite directional, and, therefore, their inclusion in an inversion scheme can provide useful information for determining the direction of eccentering ($\square$). A method for determining the direction of eccentering ($\square$) will be described later. Similarly, the xx and yy couplings have good sensitivity to the vertical conductivity ($\square_{fv}$) and, therefore, they may be included in the inversion to provide a better estimate of the vertical conductivity ($\square_{fv}$).

Figure 8:
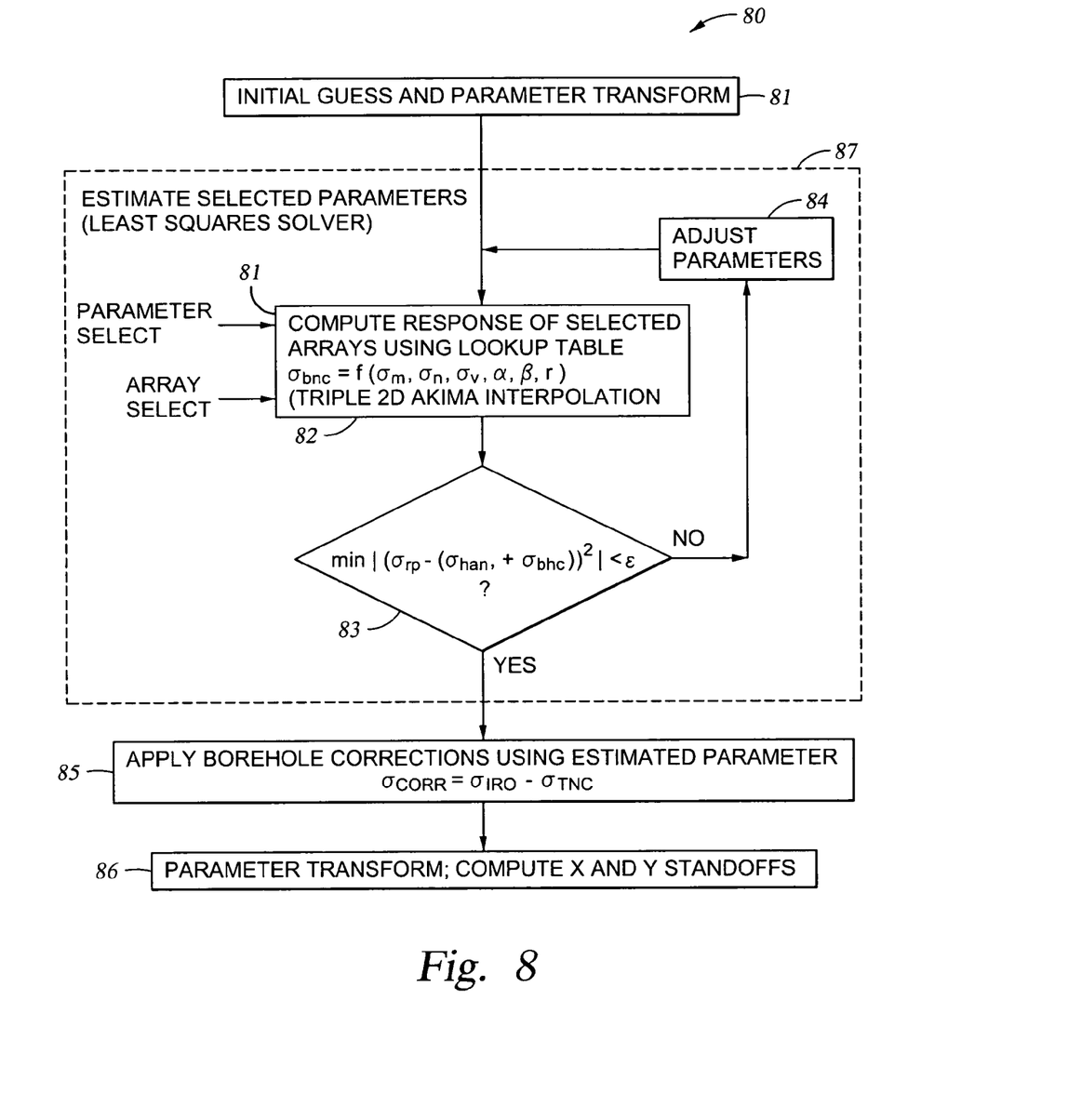
FIG. 8 shows a method for borehole correction in accordance with one embodiment of the invention.

FIG. 8 shows a method 80 in accordance with one embodiment of the invention. First, a formation-borehole model (e.g., that shown in FIG. 6) is selected and the initial estimates of the parameters are determined (step 81). Some of the parameters may be known from other measurements. For example, the mud conductivity ($\square_m$) may be obtained from a mud sensor, and the borehole radius (r) may be obtained from caliper measurements.

The method then computes array responses in the selected formation-borehole model (step 82). The computation may be a direct solution of Maxwell's equations in this model, or it may be a table built from such a solution. A table would be built to include a sufficient range of all 6 parameters. In addition, interpolation techniques, such as the Akima interpolation, may be used to estimate responses that fall between discrete parameter values. Reference is made to the paper by Hiroshi Akima: "*Bivariate Interpolation and Smooth Surface Fitting Based on Local Procedures*," (Algorithm 474), Commun. ACM 17(1): 26-31 (1974).

An inversion technique is then used to compare and match the computed results with the experimental results (step 83). This step may use any inversion technique known in the art. The inversion finds a match between the computed responses and the actual tool responses by looking for parameters in the formation-borehole model that produce a minimum in the penalty function $E_T$ or reduce the penalty function $E_T$ below a selected criterion ($\in$). Various penalty functions may be used for this purpose. Equation (7) shows a least square penalty function that may be used with embodiments of the invention.

where $E_T$ is the triaxial penalty function, $\square_m$ is the borehole (mud) conductivity; $\square_{fv}$ and $\square_{fh}$ are the vertical and horizontal conductivities of the formation, respectively; r is the borehole radius; s is the standoff; n is the eccentering direction relative to the tool coordinate system; $\square$ is the index for the directional couplings; and j is the index for the arrays. $e^{ij}$ is the weight appropriate for each coupling. N is either 3 or 9, depending on whether the receiver is axial or triaxial. Note that the penalty function $E_T$ in Equation (7) sums over 4 arrays (j=1-4), because data from 4 shortest arrays are used. One of ordinary skill in the art would appreciate that the precise number of summation depends on the measurement data used. As noted above, the hole size (i.e., borehole radius, r) and borehole (mud) conductivity ($\square_m$) can be measured independently. For example, the borehole radius (r) may be determined using a caliper and the mud conductivity ($\square_m$) determined with a mud resistivity sensor. The other four variables ($\square_{fv}$, $\square_{fh}$, s, and $\square$) can then be determined using the inversion technique and the data from the 4 shortest arrays.

The inversion process optimizes the parameters to produce a minimum penalty function $E_T$ or to produce a penalty function $E_T$ below a selected criterion ($\in$). The optimization process (step 87) is iterative: if the penalty function $E_T$ is not below the selected criterion $\in$, then the parameters are adjusted (step 84); the responses of the forward model is re-computed (step 82); and the computed responses are compared with the determined responses (step 83). These steps (84, 82, 83) are repeated until the penalty function $E_T$ is at a minimum or is below the selected criterion $\in$.

Once the penalty function $E_T$ is at a minimum or is below the selected criterion $\in$, then the estimated (optimized) parameters may be output and used to correct borehole effects in other arrays (step 85). Specifically, the optimized borehole parameters are used to compute borehole effects (in terms of conductivity) for each coupling in the remaining arrays. Then, the borehole effects are subtracted from the actual measurements (or conductivity derived from these measurements) from each of these couplings/arrays to yield the corrected measurements (or conductivities).

These optimized parameters may also be used to compute other parameters, such as tool standoffs in the x and y directions (step 86).

FIG. 8 illustrates a method in accordance with one embodiment of the invention. One of ordinary skill in the art would appreciate that modifications of this method are possible without departing from the scope of the invention. For example, other penalty functions may be used. In addition, more or fewer parameters may be determined from other measurements and used in the computation described above. For example, the direction (angle $\alpha$) of tool eccentering may be determined from the measurement data, which will be described later, and used in the computation to reduce the number of parameters to be estimated from the inversion.

Figure 9A:
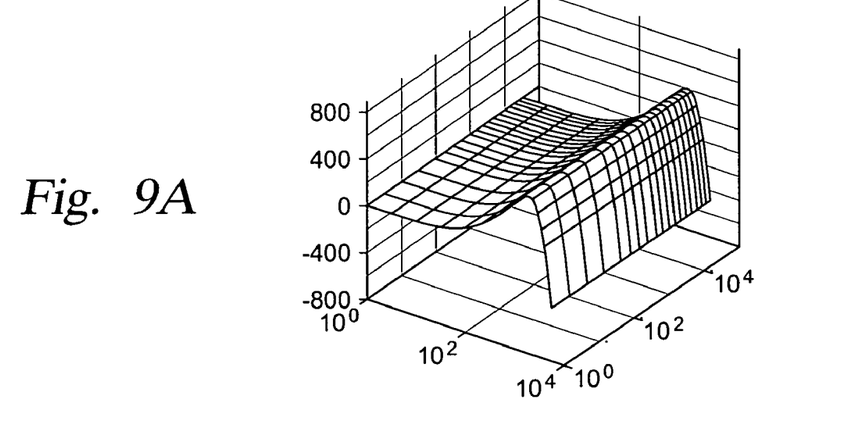
FIGS. 9a, 9b, and 9c illustrate the application of a method of the invention for correcting borehole effects.
Figure 9B:
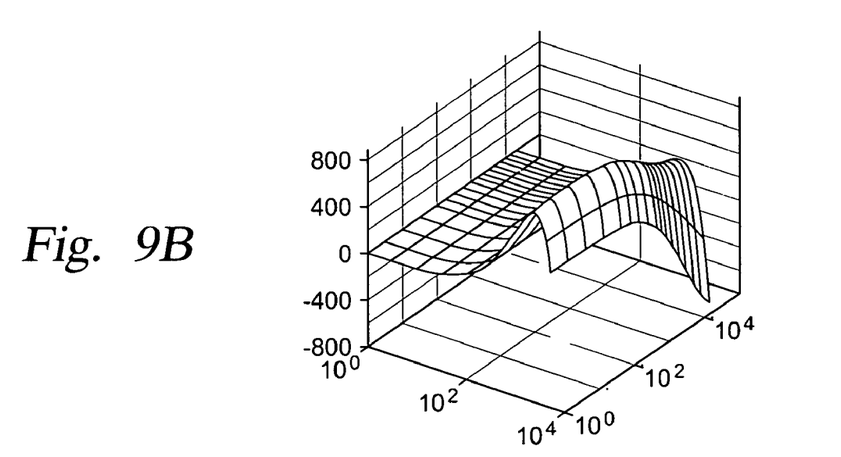
Figure 9C:
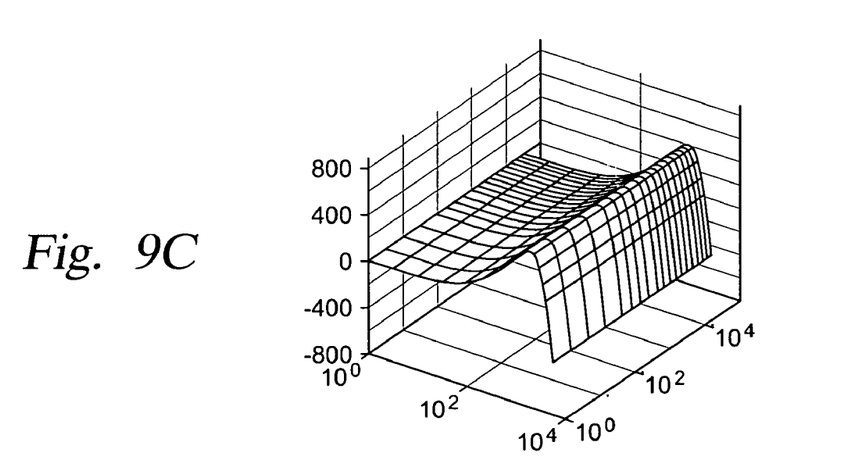

Application of a method (shown in FIG. 8) in accordance with one embodiment of the invention is illustrated in FIG. 9. This example is based on an isotropic formation, i.e., $\square_{fv}=\square_{fh}$. The graphs shown are receiver responses for a series of formation-borehole models with varying $\sigma_{fh}$ and $\sigma_m$. FIG. 9a shows the expected homogeneous formation responses of an array in a 5.0 inch borehole. The tool standoff is 0.125 inch and the direction of the eccentering is 67.5° from the x-direction. FIG. 9b shows actual tool responses of this array in the borehole under the same conditions. A comparison between FIG. 9a and FIG. 9b shows that borehole effects are quite significant when the mud is conductive. FIG. 9c shows the corrected tool responses obtained by correcting the borehole effects in the responses shown in FIG. 9b. The borehole effect correction was performed using a method similar to that shown in FIG. 8, except that the formation model is isotropic ($\sigma_{fv}=\sigma_{fh}$). The corrected data shown in FIG. 9c is substantially the same as the expected responses for the homogeneous formation shown in FIG. 9a, attesting to the effectiveness of the borehole effect correction in accordance with embodiments of the invention.

As noted above, the tool eccentering angle α may be independently determined, leaving only three unknowns to be determined in Equation (7). The direction of the displacement of the tool in the borehole can be determined from the measured triaxial data as follows. The matrix of voltages in Equation (3) can be converted into apparent conductivities:

$$\overline{\sigma}_{appt} = \begin{bmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{bmatrix} \quad (8)$$

by dividing the voltages $V_{ij}$ with the sensitivity factors $K_{ij}$, i.e., $$\sigma_{ij} = V_{ij}/K_{ij}.$$

The diagonal sensitivity factors $K_{xx}$, $K_{yy}$, $K_{zz}$ are chosen so that, in a homogeneous isotropic medium with a low conductivity, the diagonal conductivities $\sigma_{xx}=\sigma_{yy}=\sigma_{zz}=\sigma_{hom}$, where $\sigma_{hom}$ is the conductivity of the homogeneous formation, i.e., $$\overline{\sigma}_{app0} = \begin{bmatrix} \sigma_{hom} & 0 & 0 \\ 0 & \sigma_{hom} & 0 \\ 0 & 0 & \sigma_{hom} \end{bmatrix}. \quad (9)$$

Similarly, the off-diagonal sensitivity factors may be chosen to simplify rotation transformations, for example, $K_{yx}=K_{xy}$ and $K_{xx}=K_{yy}$. For the special case of a rotation around the z axis, the rotation matrix is $$R = \begin{bmatrix} \cos\phi & -\sin\phi & 0 \\ \sin\phi & \cos\phi & 0 \\ 0 & 0 & 1 \end{bmatrix} \quad (10)$$

where $\phi$ is the rotation angle. The effect of this rotation on the apparent conductivity matrix may be written as:

$$\overline{\sigma}'_{appt} = R\overline{\sigma}_{appt}R^T. \quad (11)$$

When the tool is eccentered in the x direction in a circular borehole, the apparent conductivity matrix has five non-zero components that can be computed by modeling:

$$\overline{\sigma}_{appt} = \begin{bmatrix} \sigma_{xx} & 0 & \sigma_{xz} \\ 0 & \sigma_{yy} & 0 \\ \sigma_{zx} & 0 & \sigma_{zz} \end{bmatrix}. \quad (12)$$

In the rotated coordinate system, this becomes:

$$\overline{\sigma}'_{appt} = R\begin{bmatrix} \sigma_{xx} & 0 & \sigma_{xz} \\ 0 & \sigma_{yy} & 0 \\ \sigma_{zx} & 0 & \sigma_{zz} \end{bmatrix}R^T = \begin{bmatrix} \sigma_{xx}\cos^2\phi + \sigma_{yy}\sin^2\phi & (\sigma_{xz}-\sigma_{yy})\sin\phi\cos\phi & \sigma_{xz}\cos\phi \\ (\sigma_{xx}-\sigma_{yy})\sin\phi\cos\phi & \sigma_{xz}\sin^2\phi + \sigma_{yy}\cos^2\phi & \sigma_{xz}\sin\phi \\ \sigma_{zz}\cos\phi & \sigma_{zz}\sin\phi & \sigma_{zz} \end{bmatrix}. \quad (13)$$

Estimates of the angle $\phi$ can be obtained by comparing the matrix of measurements from each triaxial receiver pair to the theoretical matrix in Equation (13). For example, comparison between $\sigma_{xz}$ and $\sigma_{yz}$ gives:

$$\phi = -\arctan\left(\frac{\sigma_{yz}}{\sigma_{xz}}\right). \quad (14)$$

Similarly, comparison between $\sigma_{zx}$ and $\sigma_{zy}$ gives:

$$\phi = -\arctan\left(\frac{\sigma_{zy}}{\sigma_{zx}}\right) \quad (15)$$

Note that measured conductivity components are used in Equations (14-15). Other estimates can be obtained from $\sigma_{xx}$, $\sigma_{xy}$, $\sigma_{yx}$, and $\sigma_{yy}$, in a similar fashion:

$$\phi = \arctan\left\{\frac{\sigma_{xx}-\sigma_{yy} \pm \sqrt{(\sigma_{xz}-\sigma_{yy})^2 + 4\sigma_{xy}\sigma_{yz}}}{2\sigma_{xy}}\right\}, \quad (16)$$

and $$\phi = \arctan\left\{\frac{\sigma_{xx}-\sigma_{yy} \pm \sqrt{(\sigma_{xz}-\sigma_{yy})^2 + 4\sigma_{xy}\sigma_{yx}}}{2\sigma_{yx}}\right\}. \quad (17)$$

Equations (16) and (17) give four angles, but only two of these are physically distinct. Note that $\phi$ in Equations (10, 13-17) is the same as $\phi$ in FIG. (6). To take into account data from several triaxial receiver pairs, a least squares minimization may be performed on all $\phi_i$ values obtained in Equations (14-17) to determine the angle $\phi$. After the angle $\phi$ is determined, the borehole corrections may then be applied to the data using the computed values in Equation (12). The corrected matrix of apparent conductivities is then rotated back to the original tool coordinates, as follows:

$$\bar{\sigma}_{corr} = R^T \bar{\sigma}'_{corr} R. \quad (18)$$

Figure 10:
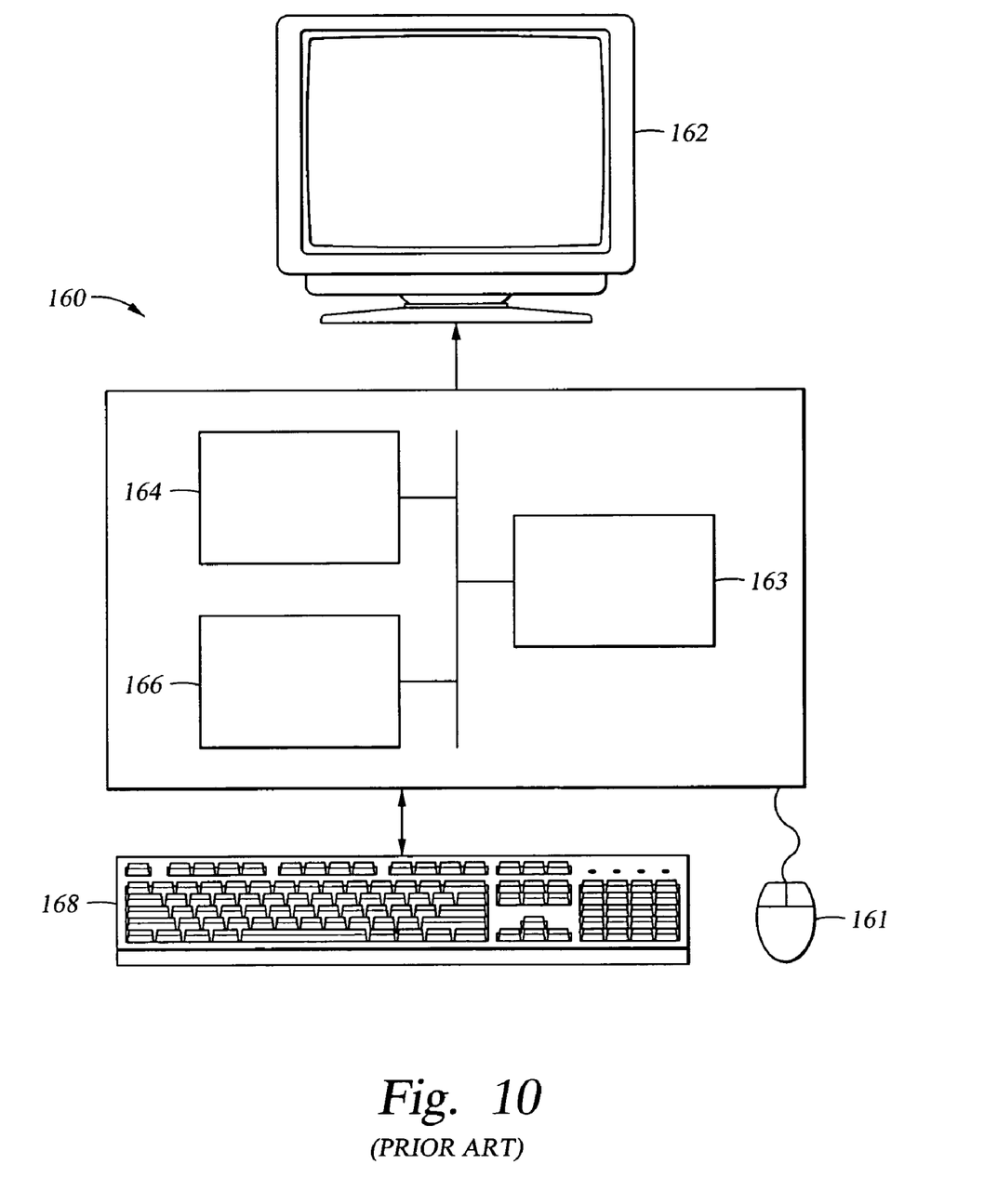
FIG. 10 illustrates a prior art computer that may be used with embodiments of the invention.

Some embodiments of the invention relate to systems for performing the above-described methods for correcting borehole effects in triaxial arrays. A system in accordance with embodiments of the invention may be implemented on a stand alone computer or a downhole computer that is included on a tool. FIG. 10 shows a general purpose computer that may be used with embodiments of the invention.

As shown in FIG. 10, a general computer system may include a main unit 160, a display 162 and input devices such as a keyboard 168 and a mouse. The main unit 160 may include a central processor unit 164, a permanent memory (e.g., a hard disk) 163 and a random access memory 166. The memory 163 may include a program that includes instructions for performing the methods of the invention. A program may be embodied on any computer retrievable medium, such as a hard disk, a diskette, a CD-ROM, or any other medium known or yet to be developed. The programming may be accomplished with any programming language and the instructions may be in a form of a source codes that may need compilation before the computer can execute the instructions or in a compiled (binary) or semi-compiled codes. The precise form and medium the program is on are not germane to the invention and should not limit the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for modeling borehole effects of an induction tool having a plurality of arrays that include at least one transverse array, the method comprising:
    selecting a formation-borehole model having a set of parameters, wherein the set of parameters comprises a direction of tool eccentering;
    determining initial values for the set of parameters; computing expected responses for a selected set of arrays from the plurality of arrays of the induction tool, wherein the computing is based on the formation-borehole model;
    comparing the expected responses with actual responses for the selected set of arrays;
    adjusting values of the set of parameters, if a difference between the expected responses and the actual responses is not less than a predetermined criterion;
    repeating the computing, the comparing, and the adjusting, until the difference between the expected responses and the actual responses is less than the predetermined criterion;
    determining the borehole effects from final values of the set of parameters.

2. The method of claim 1, wherein the set of parameters further comprises a vertical formation conductivity and a horizontal formation conductivity.

3. The method of claim 2, wherein the set of parameter further comprises mud resistivity, a borehole diameter, and a tool standoff.

4. The method of claim 1, wherein the initial values for the set of parameters comprise at least one value determined from borehole logging data.

5. The method of claim 4, wherein the at least one value is selected from mud resistivity and a borehole diameter.

6. The method of claim 5, wherein the mud resistivity is determined by a mud resistivity sensor and the borehole diameter is determined by a caliper.

7. The method of claim 1, wherein the comparing comprises using a penalty function.

8. The method of claim 7, wherein the penalty function is based on squares of differences between the expected responses and the actual responses.

9. The method of claim 1, further comprising correcting measurements of the plurality of arrays using the determined borehole effects.

10. The method of claim 1, wherein the induction tool comprises at least one triaxial array.

11. The method of claim 10, wherein the initial values for the set of parameters comprises the direction of tool eccentering determined from data obtained with the at least one triaxial array.

12. The method of claim 11, wherein the direction of eccentering is determined from off-diagonal elements of an apparent conductivity matrix.

13. The method of claim 12, wherein the apparent conductivity matrix is rotated to produce a simplified matrix of apparent conductivities.

14. The method of claim 13, wherein borehole corrections are applied to the simplified matrix of apparent conductivities to produce a corrected matrix of apparent conductivities.

15. The method of claim 14, further comprising rotating the corrected matrix of apparent conductivities to correspond to an original tool orientation.

16. A system for borehole effects of an induction tool having a plurality of arrays that include at least one transverse array, the system comprising a processor and a memory, wherein the memory stores a program having instructions for:
    selecting a formation-borehole model having a set of parameters, wherein the set of parameters comprises a direction of tool eccentering;
    determining initial values for the set of parameters; computing expected responses for a selected set of arrays from the plurality of arrays of the induction tool, wherein the computing is based on the formation-borehole model;
    comparing the expected responses with actual responses for the selected set of arrays;
    adjusting values of the set of parameters, if a difference between the expected responses and the actual responses is no less than a predetermined criterion;
    repeating the computing, the comparing, and the adjusting, until the difference between the expected responses and the actual responses is less than the predetermined criterion;
    determining the borehole effects from final values of the set of parameters.

17. The system of claim 16, wherein the set of parameters further comprises a vertical formation conductivity and a horizontal formation conductivity.

18. The system of claim 17, wherein the set of parameter further comprises mud resistivity, a borehole diameter, and a tool standoff.

19. The system of claim 16, wherein the comparing step comprises using a penalty function.

20. The system of claim 19, wherein the penalty function is based on squares of differences between the expected responses and the actual responses.

21. The system of claim 16, wherein the system further comprises instructions for correcting measurements of the plurality of arrays using the determined borehole effects.

* * * * *